(12) United States Patent
Smith et al.

(10) Patent No.: US 12,245,719 B2
(45) Date of Patent: Mar. 11, 2025

(54) BEVERAGE DISPENSING MACHINE (71) Applicant: IPECO HOLDINGS LIMITED, Southend on Sea (GB)

(72) Inventors: Jeremy Smith, Stock (GB); Taner Haker, Leigh on Sea (GB); Gary Ford, Elm Park (GB); Stefano La Monaca, Southend on Sea (GB); Albert Van Dorssen, Rijswijk (NL)

(73) Assignee: Ipeco Holdings Limited

( * ) Notice: Subject to any disclaimer, the term of this patent is extended or adjusted under 35 U.S.C. 154(b) by 133 days.

(21) Appl. No.: 17/921,396

(22) PCT Filed: Apr. 27, 2021

(86) PCT No.: PCT/EP2021/060975
§ 371 (c)(1),
(2) Date: Oct. 26, 2022

(87) PCT Pub. No.: WO2021/219632
PCT Pub. Date: Nov. 4, 2021

(65) Prior Publication Data
US 2023/0240470 A1    Aug. 3, 2023

(30) Foreign Application Priority Data
Apr. 27, 2020    (GB) .................................... 2006177

(51) Int. Cl.
*A47J 31/44*    (2006.01)
*A47J 31/46*    (2006.01)
(Continued)

(52) U.S. Cl.
CPC ....... *A47J 31/4425* (2013.01); *A47J 31/4482* (2013.01); *A47J 31/46* (2013.01);
(Continued)

(58) Field of Classification Search
CPC ...... A47J 31/46; A47J 31/4482; A47J 31/525; A47J 31/4425
See application file for complete search history.

(56) References Cited

U.S. PATENT DOCUMENTS 4,949,627 A * 8/1990 Nordskog ................ F24H 1/102
99/295
6,047,630 A    4/2000 Brown et al.
(Continued)

FOREIGN PATENT DOCUMENTS

CN    110326972    10/2019
EP    1157647    7/2004
(Continued)

OTHER PUBLICATIONS

PCT Written Opinion of the International Searching Authority for International Application No. PCT/EP2021/060975.
(Continued)

*Primary Examiner* — Timothy L Maust
(74) *Attorney, Agent, or Firm* — King & Partners, PLC (57) ABSTRACT

Aspects of the present invention relate to A beverage dispensing machine (1) for dispensing a beverage (BV) into a vessel (2). The beverage dispensing machine (1) has a upper engaging member (63) movable to a deployed position for engaging a upper portion of the vessel (2) and at least one side engaging member (68-1, 68-2) movable to a deployed position for engaging a sidewall (51) of the vessel (2). An actuating mechanism (5) is provided for deploying the upper engaging member (63) in conjunction with the at least one side engaging member (68-1, 68-2) to retain the vessel (2) in the beverage dispensing machine (1). Aspects of the present invention also relate to a vehicle having a beverage dispensing machine (1).

18 Claims, 10 Drawing Sheets

(51) Int. Cl.
*A47J 31/52* (2006.01)
*B64D 11/04* (2006.01)
*B65D 25/28* (2006.01)
*B65D 25/42* (2006.01)

(52) U.S. Cl.
CPC ............ *A47J 31/525* (2018.08); *B64D 11/04* (2013.01); *B65D 25/2811* (2013.01); *B65D 25/42* (2013.01); *A47J 2203/00* (2013.01)

(56) References Cited

U.S. PATENT DOCUMENTS

| | | | | |
|---|---|---|---|---|
| 6,227,101 | B1 * | 5/2001 | Rabadi | A47J 31/52 99/290 |
| 7,287,562 | B2 * | 10/2007 | Tanikawa | B67C 3/2614 141/367 |
| 8,061,263 | B1 * | 11/2011 | Hannah | A47J 31/4403 99/305 |
| 8,387,668 | B2 * | 3/2013 | Macquet | B67C 3/004 141/90 |
| 8,955,562 | B2 * | 2/2015 | Krulitsch | B67C 3/2637 141/82 |
| 11,702,330 | B2 * | 7/2023 | Pettipher | B67D 1/0894 141/1 |
| 2002/0074476 | A1 | 6/2002 | Cooner, Jr. et al. | |
| 2010/0186499 | A1 | 7/2010 | Ramus et al. | |
| 2019/0335937 | A1 | 11/2019 | Kelly et al. | |

FOREIGN PATENT DOCUMENTS

| | | |
|---|---|---|
| WO | WO 2007/120460 | 10/2007 |
| WO | WO 2016/166778 | 10/2016 |

OTHER PUBLICATIONS

Search Report for GB 2217140.9 dated Dec. 7, 2023.
Examination Report for GB 2217140.9 dated Jan. 11, 2024.
Intention to Grant for GB 2217140.9 dated May 1, 2024.

* cited by examiner

BEVERAGE DISPENSING MACHINE

CROSS-REFERENCE TO RELATED APPLICATION(S)

This application is a § 371 national phase of International Application Number PCT/EP2021/060975, filed on Apr. 27, 2021, which claims the benefit of Great Britain Patent Application Number 2006177.6, filed on Apr. 27, 2020-all of which are hereby incorporated herein by reference in their entirety, including all references cited therein.

TECHNICAL FIELD

The present disclosure relates to a beverage dispensing machine. Aspects of the invention relate to a beverage dispensing machine, a galley appliance and a vehicle comprising a beverage dispensing machine.

BACKGROUND

It is known to provide a beverage dispensing machine in a galley of a vehicle, for example in an aircraft galley. The beverage dispensing machine typically dispenses a beverage into a vessel, such as a jug. The beverage may be a hot beverage, such as tea or coffee. To help prevent the vessel becoming dislodged, the beverage dispensing machine may comprise a mechanism for engaging the vessel. The mechanism may, for example, engage the top of the vessel.

It is an aim of the present invention to address one or more of the disadvantages associated with the prior art.

SUMMARY OF THE INVENTION

Aspects and embodiments of the invention provide a beverage dispensing machine, a galley appliance and a vehicle as claimed in the appended claims According to an aspect of the present invention there is provided a beverage dispensing machine for dispensing a beverage into a vessel, wherein the beverage dispensing machine comprises:
  an upper engaging member movable to a deployed position for engaging an upper portion of the vessel; and
  at least one side engaging member movable to a deployed position for engaging a side of the vessel. The beverage dispensing machine may comprise an actuating mechanism for deploying the upper engaging member and the at least one side engaging member to retain the vessel in the beverage dispensing machine. The actuating mechanism is operable to deploy the upper engaging member and the at least one side engaging member to their respective deployed positions. In use, the upper engaging member and the at least one side engaging member can be deployed to retain the vessel in the beverage dispensing machine. The engagement of the vessel by the upper engaging member and the at least one side engaging member reduces the likelihood of the vessel becoming dislodged. This is particularly advantageous when the beverage dispensing machine is installed in the galley of a vehicle, such as an aircraft, which may be moving.

The upper engaging member may be movable between the deployed position and an undeployed position. The movement of the upper engaging member may comprise or consist of a pivoting or rotational movement. Alternatively, the movement of the upper engaging member may comprise or consist of a translational movement. In the deployed position, the upper engaging member is configured to engage the upper portion of the vessel, for example a top portion of the vessel. At least in certain embodiments, the upper engaging member may be configured to disengage from the upper portion of the vessel in the undeployed position. For example, the upper engaging member may be separated from, or spaced apart from the vessel. The upper engaging member may be moved to the undeployed position to enable the vessel to be removed from (or inserted into) the beverage dispensing machine.

The upper engaging member may be movable laterally, for example to grip or hold the upper part of the vessel. Alternatively, or in addition, the upper engaging member may be movable vertically. The upper engaging member may be displaced downwardly to transition from the undeployed position to the deployed position; and displaced upwardly to transition from the deployed position to the undeployed position. In the undeployed position, the upper engaging member may be in a raised position suitable for inserting the vessel into the beverage dispensing machine. In the deployed position, the upper engaging member may be in a lowered position for engaging the vessel. The upper engaging member may thereby retain the vessel in the beverage dispensing machine.

The or each side engaging member may be movable between the deployed position and an undeployed position. The movement of the or each side engaging member may comprise or consist of a translational movement. Alternatively, the movement of the or each side engaging member may comprise or consist of a pivoting or rotational movement. The or each side engaging member may be pivotally mounted. The or each side engaging member may pivot about a pivot axis which extends horizontally or vertically.

In the deployed position, the or each side engaging member may be configured to engage the side of the vessel, for example a sidewall of the vessel. At least in certain embodiments, the or each side engaging member may be configured to disengage from the side of the vessel in the undeployed position. For example, the or each side engaging member may be separated from, or spaced apart from, the side of the vessel. The or each side engaging member may be moved to the undeployed position to enable the vessel to be removed from (or inserted into) the beverage dispensing machine.

The or each side engaging member may be movable laterally. The or each side engaging member may be displaced in a first lateral direction to transition from the undeployed position to the deployed position; and displaced in a second lateral direction (opposite to the first lateral direction) to transition from the deployed position to the undeployed position. In the undeployed position, the or each side engaging member may be in a retracted position for inserting the vessel into the beverage dispensing machine. In the deployed position, the or each side engaging member may be in an extended position for retaining the vessel in the beverage dispensing machine.

The beverage dispensing machine may comprise first and second side engaging members. The first and second side engaging members may be opposable. For example, the first and second side engaging member may be configured to engage opposing sides of the vessel when in their deployed positions. The first and second side engaging members may be movable inwardly as they transition from the undeployed position to the deployed position. The first and second side engaging members may be movable outwardly as they transition from the deployed position to the undeployed position. The first and second side engaging members may be configured to engage opposing sides of the vessel. The first and second side engaging members may form a negative return when in their deployed positions for retaining the vessel in the beverage making machine.

At least in certain embodiments, the actuating mechanism may be configured to deploy the upper engaging member in conjunction with the at least one side engaging member. Thus, the actuating mechanism may control deployment of both the upper engaging member and the or each side engaging member. In use, the upper engaging member and the at least one side engaging member may operate in concert selectively to engage the vessel and/or to release the vessel. At least in certain embodiments, the dual operation of the upper engaging member and the at least one side engaging member may facilitate operation of the beverage dispensing machine.

The actuating mechanism may comprise a solenoid or an electromechanical actuator. Alternatively, the actuating mechanism may comprise a handle or a lever. In use, the upper engaging member and the at least one side engaging member may be actuated when the handle is operated. The handle may be pivotally mounted. The handle may be movable between a locked position and an unlocked position.

The deployment of the upper engaging member may comprise or consist of a vertical movement. The upper engaging member may be displaced vertically to engage the upper portion of the vessel.

The beverage dispensing machine may comprise a dispensing nozzle for dispensing the beverage through an aperture formed in the vessel. When deployed, the upper engaging member may be configured at least partially to close the aperture. The upper engaging member may be configured at least substantially to seal the aperture. The upper engaging member may comprise at least one fluid seal for at least substantially sealing the aperture. This may help to reduce spillage as the beverage is dispensed into the vessel.

The or each fluid seal may comprise an annular seal. The annular seal may comprise an elastomeric member, such as an O-ring. Alternatively, or in addition, the fluid seal may comprise a projection or a flange for cooperating with the vessel.

The upper engaging member may comprise a plurality of the fluid seals. The fluid seals may be configured at least substantially to seal a plurality of vessels having different configurations. For example, the fluid seals may have different sizes and/or profiles. The fluid seals may be configured to seal a plurality of apertures having different sizes and/or profiles. The upper engaging member may thereby cooperate with a plurality of vessels having different configurations.

The fluid seals may be arranged concentrically. Alternatively, the fluid seals may be arranged eccentrically, for example to seal vessels having apertures formed in different positions.

The dispensing nozzle may be disposed in the upper engaging member. The at least one fluid seal may extend around the dispensing nozzle.

The beverage dispensing machine may comprise a liquid level sensor for detecting the level of the beverage in the vessel. The liquid level sensor may comprise an ultrasonic sensor, for example.

The beverage dispensing machine may comprise a sensor for detecting when the beverage in the vessel is at a predetermined level. The sensor may, for example, determine that the vessel is partially or completely full. The sensor may be configured to determine when the vessel is overflowing or is about to overflow. The sensor may comprise first and second electrodes. The first and second electrodes may be disposed at a predetermined height. The first and second electrodes may be disposed in the upper engaging member. The sensor may comprise first and second annular electrodes disposed on the upper engaging member. The first and second annular electrodes may be arranged concentrically.

The deployment of the at least one side engaging member may comprise or consist of a lateral movement of the or each side engaging member to engage the sidewall of the vessel. The lateral movement may comprise or consist of a pivoting or rotational movement. Alternatively, the lateral movement may comprise or consist of a translational movement.

A spring biasing means may be provided for biasing the or each side engaging member towards an undeployed position. Alternatively, the spring biasing means may be provided for biasing the or each side engaging member towards an extended position.

The beverage dispensing machine may comprise two of the side engaging members. The beverage dispensing machine may comprise two opposable side engaging members. For example, the beverage dispensing machine may comprise opposing first and second side engaging members for engaging opposing sides of the vessel.

The upper engaging member and the at least one side engaging member may be operatively connected to each other. The upper engaging member may comprise at least one arm for deploying the at least one side engaging member.

The beverage dispensing machine may optionally comprise a retainer for retaining the vessel. The retainer may be in the form of a turn retainer. The retainer may be rotatable between a deployed position and an undeployed position. In the undeployed position, the retainer may be retracted or withdrawn so as not to engage the vessel. In the deployed position, the retainer may project or extend so as to engage the vessel. The retainer may be operable by hand. The retainer may be independent of the actuating mechanism. At least in certain embodiments, the actuating mechanism may be actuated to deploying the upper engaging member and the at least one side engaging member without deploying the retainer. The retainer may be configured to engage a lower part of the beverage dispensing machine. The retainer may be configured to engage a lower portion of a side of the vessel.

The beverage dispensing machine as described herein comprising an actuator for deploying the upper engaging member and the at least one side engaging member. The actuator may comprise an electromagnetic actuator, such as a solenoid or an electric motor. Alternatively, the actuator may comprise a handle or lever operable manually.

The beverage dispensing machine may comprise a housing for removably mounting the beverage dispensing machine in a galley of a vehicle.

According to a further aspect there is provided a beverage dispensing machine for dispensing a beverage, wherein the beverage dispensing machine comprises:
  an engaging member for engaging one of at least a first vessel and a second vessel, the first vessel having a first aperture and the second vessel having a second aperture; the engaging member comprising:
    a first feature for cooperating with the first vessel at least partially to close the first aperture; and
    a second feature for cooperating with the second vessel at least partially to close the second aperture;

wherein the first feature and the second feature have different sizes and/or different profiles. The first and second features are configured to cooperate with the first and second vessels. The first and second vessels may have different shapes and/or configurations. At least in certain embodiments, the beverage dispensing machine can be used with different vessels. The first feature and the first vessel may have complementary profiles. The second feature and the second vessel may have complementary profiles.

The first feature may be configured at least substantially to seal the first aperture. The second feature may be configured at least substantially to seal the second aperture. The first feature may comprise a first fluid seal. The second feature may comprise a second fluid seal.

The first feature may comprise a first projection. The first projection may locate in the first aperture. The first feature may comprise a first channel. An upper portion of the first vessel, for example a lip or edge, may locate in the first channel.

The second feature may comprise a second projection. The second projection may locate in the second aperture. The second feature may comprise a second channel. An upper portion of the second vessel, for example a lip or edge, may locate in the second channel.

The first and second features may be annular. The first and second features may be arranged concentrically. The first and second features may be centred on a vertical axis. The vertical axis may be arranged at least substantially coincident with a vertical centreline of the first vessel or the second vessel.

According to a further aspect of the present invention there is provided a beverage dispensing machine for dispensing a beverage, wherein the beverage dispensing machine comprises:
a dispensing nozzle for dispensing the beverage; and
a sensor for detecting when the beverage is at a predetermined level in the vessel. The sensor may comprise a first electrode and a second electrode. The first electrode and the second electrode may be disposed at a predetermined height which determines the level of the beverage in the vessel.

The sensor may comprise a first annular electrode and a second annular electrode, the first annular electrode being disposed within the second annular electrode. The first and second annular electrodes may be formed around the dispensing nozzle.

The first and second annular electrodes may be provided at or near the top of the vessel, for example to determine when the vessel is full or overflowing. The predetermined level in this scenario may correspond to the top of the vessel, or a predefined distance below the top of the vessel.

The first and second annular electrodes may be arranged concentrically. The first and second annular electrodes may be arranged concentrically about a vertical axis. The vertical axis may be arranged at least substantially coincident with a vertical centreline of the vessel.

According to a further aspect of the present invention there is provided a beverage dispensing machine for dispensing a beverage, wherein the beverage dispensing machine comprises:
a dispensing assembly comprising a dispensing nozzle for dispensing the beverage into a vessel;
a water tank assembly comprising a water tank and at least one water heater;
wherein the water tank assembly is removable from the beverage dispensing machine as a unit. The water tank assembly can be removed to facilitate servicing and maintenance. The water tank assembly may comprise a chassis for supporting the water tank and the at least one water heater. The water tank assembly may comprise an inlet port for connection to a water supply, for example a galley water supply. Alternatively, or in addition, the water tank assembly may comprise one or more valves for controlling the supply of water to the dispensing assembly. One or more releasable conduit connectors may be provided to connect the water tank to the dispensing assembly.

According to a further aspect there is provided a galley appliance comprising a beverage dispensing machine of the type described herein.

According to a further aspect there is provided a vehicle comprising at least one beverage dispensing machine as described herein. The vehicle may be an aircraft.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A beverage dispensing machine 1 in accordance with an embodiment of the present invention is described herein with reference to the accompanying Figures. The beverage dispensing machine 1 is configured to dispense a beverage BV into a vessel 2, such as a jug. As described herein, the vessel 2 is releasably retained in the beverage dispensing machine 1.

The beverage dispensing machine 1 in the present embodiment is a galley appliance for use in a galley of a vehicle (not shown). The beverage dispensing machine 1 in the present embodiment is adapted for use in an aircraft galley. It will be understood that the beverage dispensing machine 1 may be used in other types of vehicle, such as a train, a ship or a yacht.

Figure 1:
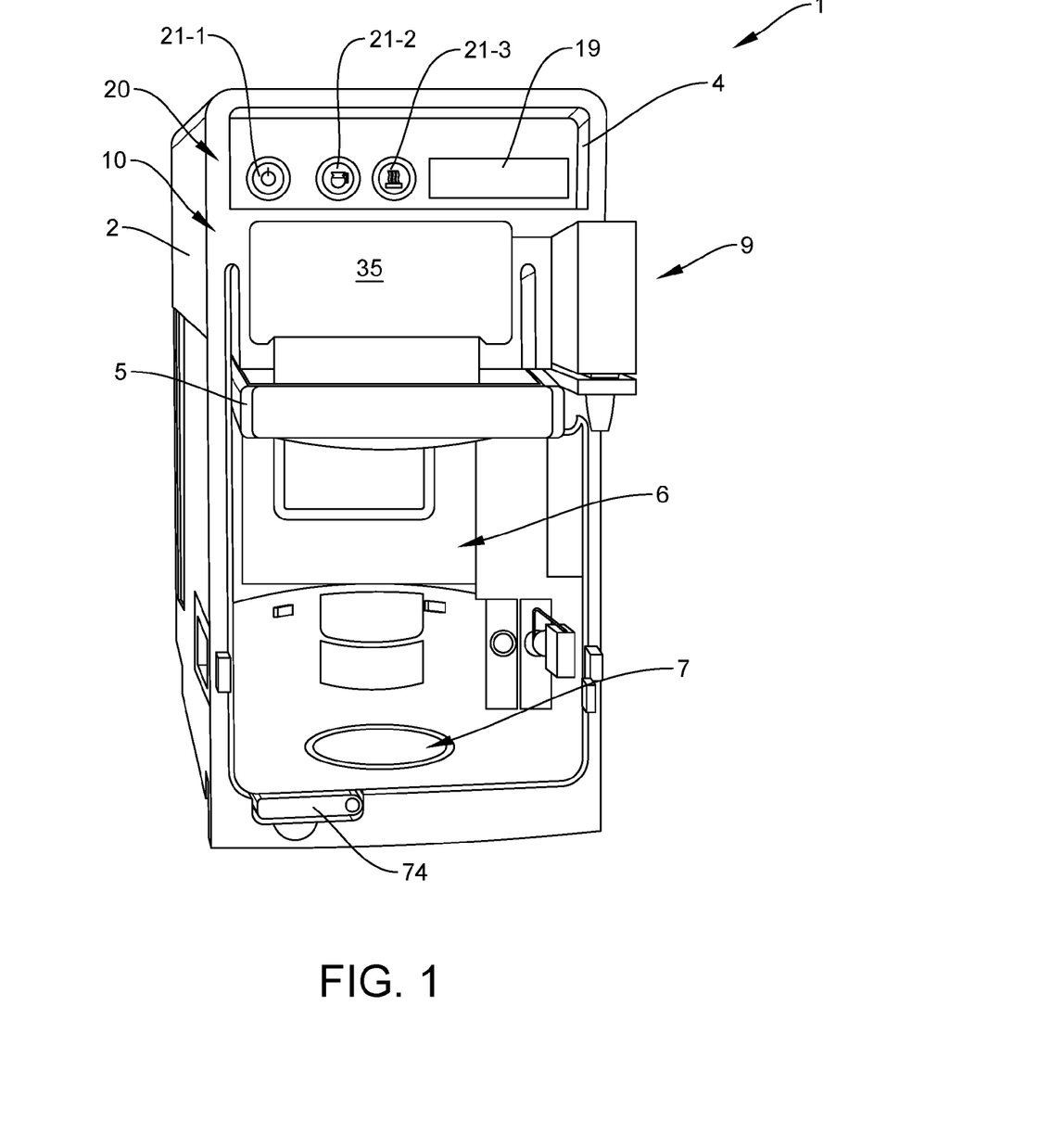
FIG. 1 shows a front view of a beverage dispensing machine in accordance with an embodiment of the present invention.
Figure 2:
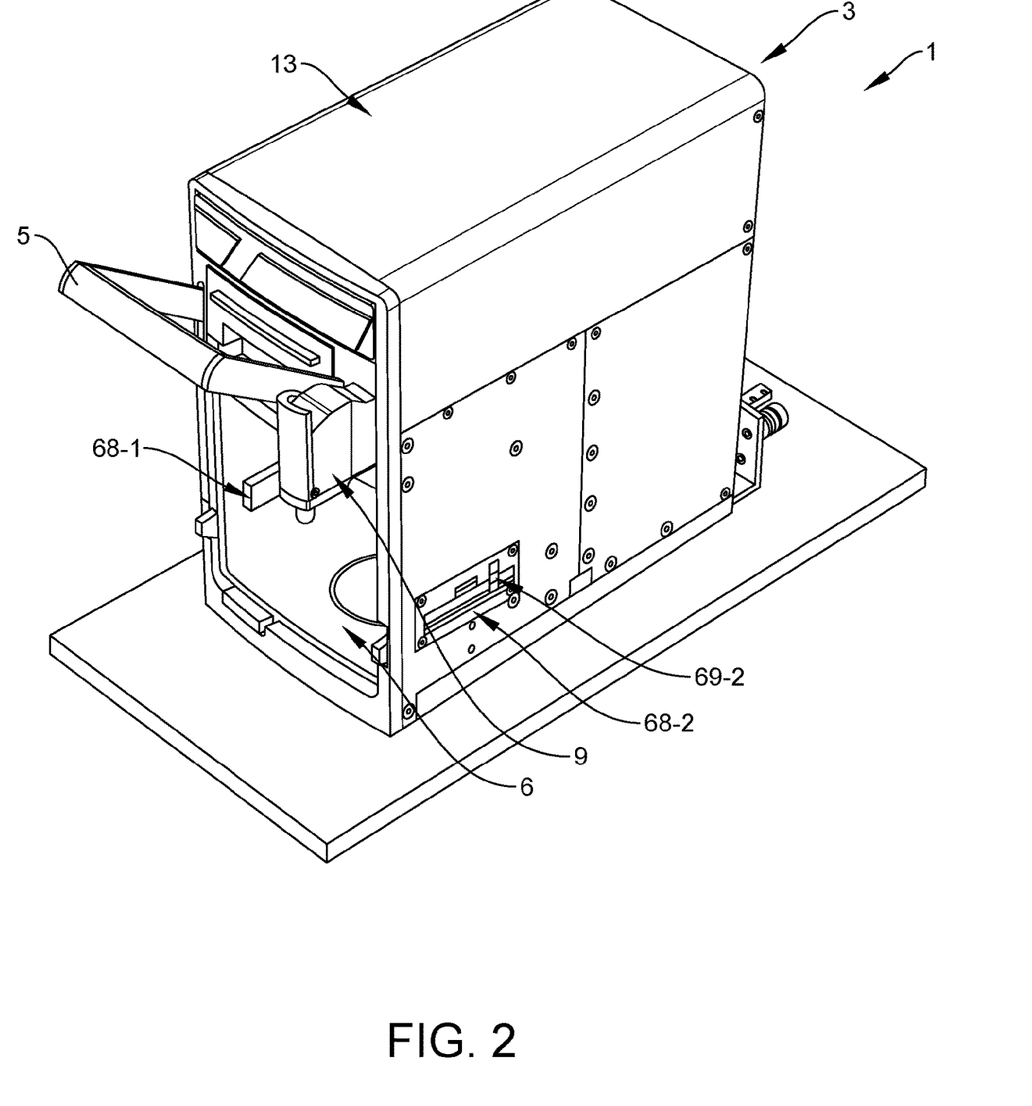
FIG. 2 shows a perspective view of the beverage dispensing machine shown in FIG. 1.
Figure 3:
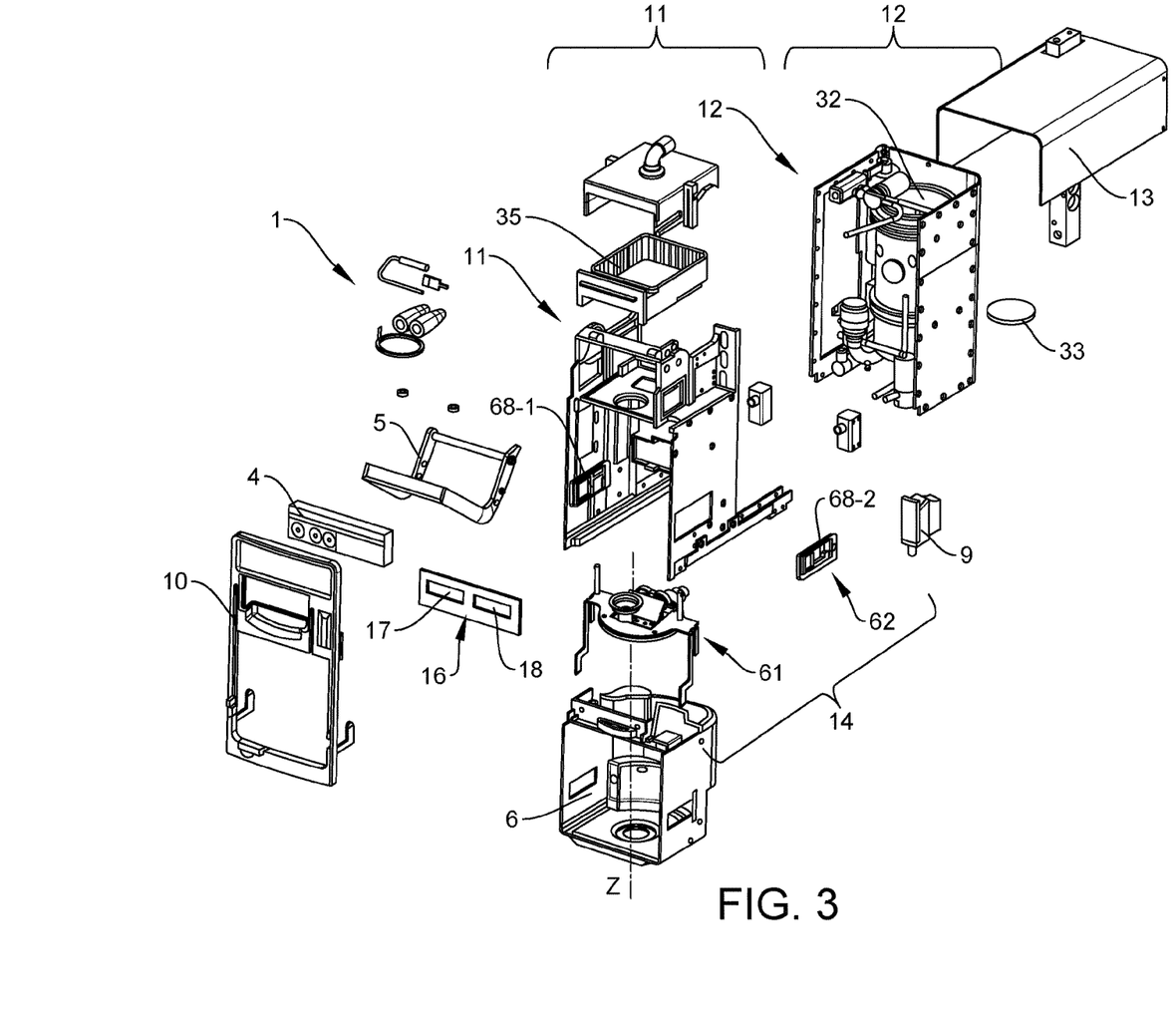
FIG. 3 shows an exploded view of the beverage dispensing machine according to the present embodiment.
Figure 4A:
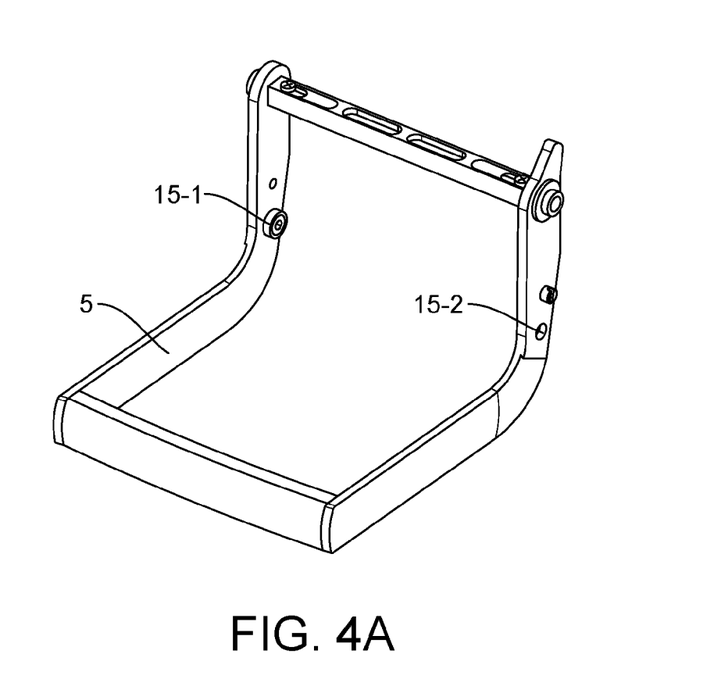
FIG. 4A shows a handle for operating the beverage dispensing machine.
Figure 4B:
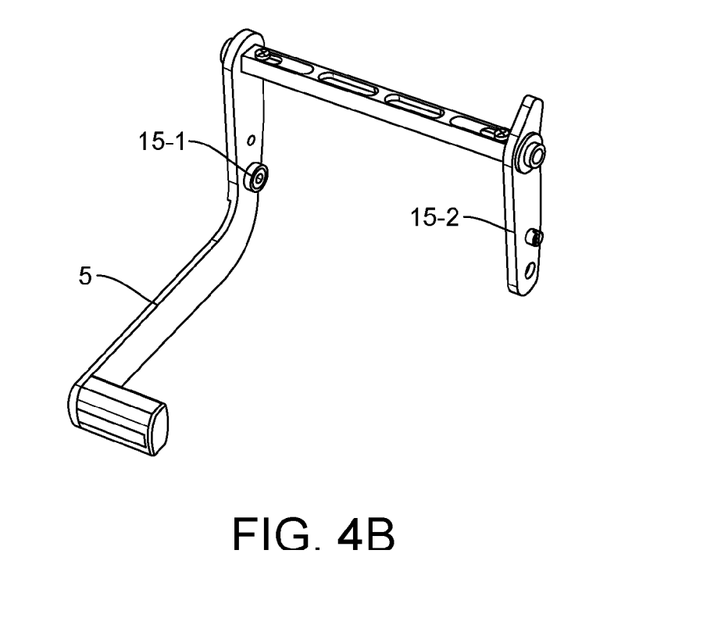
FIG. 4B shows a variant of the handle shown in FIG. 4A.

With reference to FIGS. 1, 2 and 3, the beverage dispensing machine 1 comprises a housing 3, a control panel 4, an actuating mechanism 5, a chamber 6, a vessel heater 7, a dispensing nozzle 8 and a hot water faucet 9. The housing 3 comprises a front panel 10, a dispensing assembly 11, a water tank assembly 12 and a cover 13. The chamber 6 is formed in the front panel 10 and the dispensing assembly 11. In use, the vessel 2 locates in the chamber 6. The beverage dispensing machine 1 comprises a retention mechanism 14 for releasably engaging the vessel 2. The retention mechanism 14 can be selectively engaged and disengaged. When the retention mechanism 14 is engaged, the vessel 2 is retained in the chamber 6. When the retention mechanism 14 is disengaged, the vessel 2 is not retained (i.e. the vessel 2 is released) and can be removed from the chamber 6. The actuating mechanism 5 is operable to actuate the retention mechanism 14. In the present embodiment, the actuating mechanism 5 comprises a manually operated handle pivotally mounted to the dispensing assembly 11. The retention mechanism 14 is configured to retain the vessel 2 in the beverage dispensing machine 1 when the handle 5 is in a lowered position, as shown in FIG. 1. The retention mechanism 14 releases the vessel 2 when the handle 5 is in a raised position, as shown in FIG. 2. As shown in FIG. 4A, the handle 5 comprises first and second cams 15-1, 15-2 for operating the retention mechanism 14. A variant of the handle 5 is shown in FIG. 4B. The vessel heater 7 is disposed at the bottom of the chamber 6 and, in use, is energized to heat the vessel 2.

The dispensing assembly 11 and the water tank assembly 12 are separate sub-assemblies within the beverage dispensing machine 1. The water tank assembly 12 is fastened to the dispensing assembly 11. The cover 13 is provided over the dispensing assembly 11 and the water tank assembly 12. The dispensing nozzle 8 is provided in the dispensing assembly 11 and is configured to dispense the beverage BV into the vessel 2. In the present embodiment, the water tank assembly 11 is removable from the beverage dispensing machine 1 as a single unit to facilitate servicing and maintenance. The cover 13 is removed from the beverage dispensing machine 1 and the water tank assembly 11 can be removed as a single assembly (shown in FIG. 3).

The beverage dispensing machine 1 comprises an electronic control unit (ECU) 16. The ECU 16 comprises an electronic processor 17 and a memory 18. A set of computational instructions is stored in the memory 18. When executed, the computational instructions cause the electronic processor 17 to execute the method(s) described herein. The control panel 4 comprises a display screen 19 and an interface 20 for controlling operation of the beverage dispensing machine 1. The ECU 16 is connected to the display screen 19 and the interface 20. The interface 20 comprises one or more capacitive switches 21-*n*. In the present embodiment, the capacitive switches 21-*n* include an ON/OFF switch 21-1, a brewing control switch 21-2 and a heater control switch 21-3. The operating mode of the beverage dispensing machine 1 is displayed on the display screen 19. There is improved access to the control panel 4 when the handle 5 is in the lowered position to facilitate operation.

Figure 5:
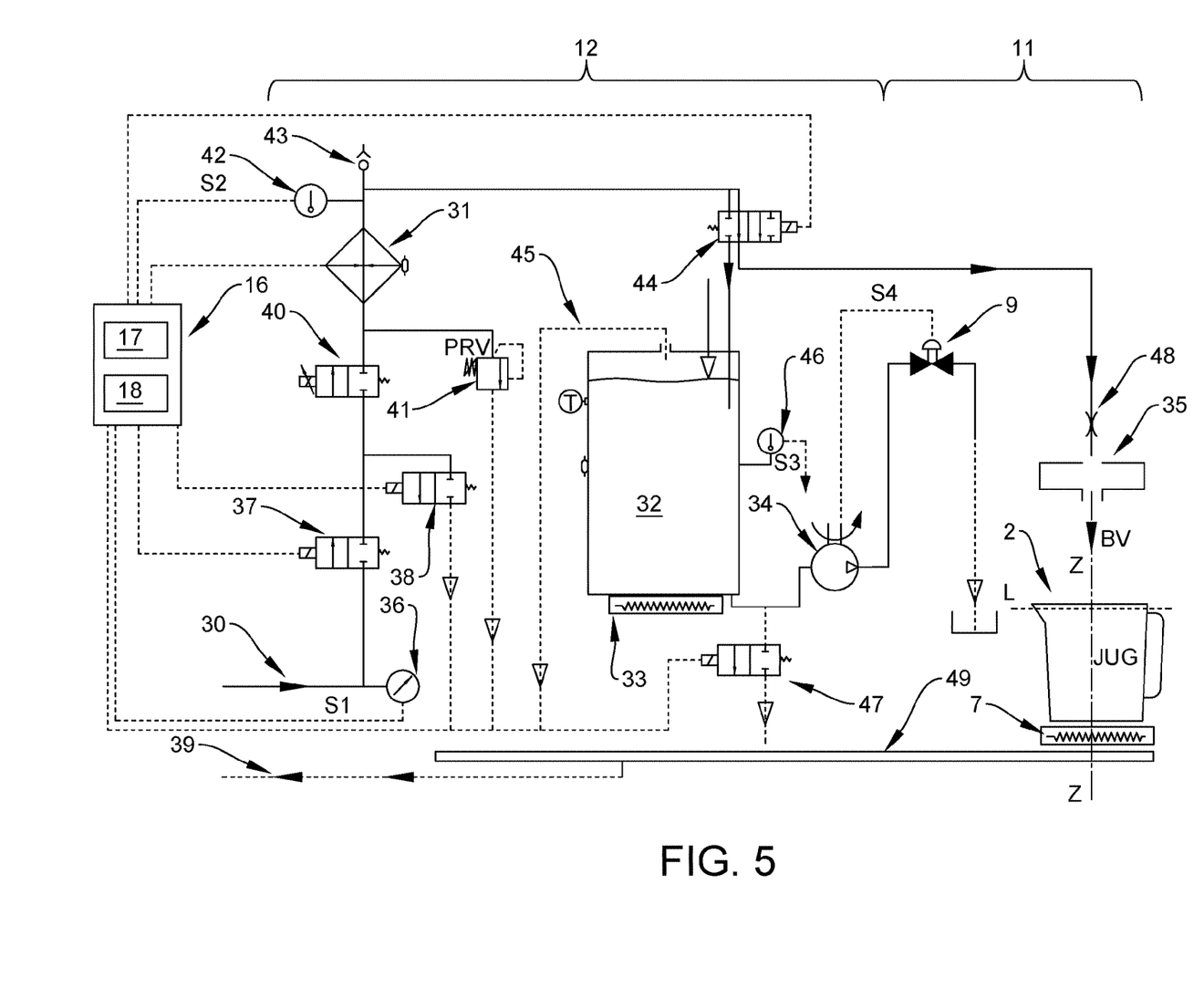
FIG. 5 shows a schematic representation of the beverage dispensing machine according to the present embodiment.

A schematic representation of the beverage dispensing machine 1 is shown in FIG. 5. The beverage dispensing machine 1 comprises an inlet port 30; a flow-through water heater 31; a water tank 32; a water tank heating element 33; a pump 34; and a brew tray 35. The flow-through water heater 31, the water tank 32, the water tank heating element 33 and the pump 34 are provided in the water tank assembly 12. The water tank 32 is not pressurised and is supplied with water heated by the flow-through water heater 31. The flow-through water heater 31 has a thermal fuse (not shown) to prevent overheating. The pump 34 is operable to supply water from the water tank 32 to the hot water faucet 9. The brew tray 35 is provided to brew the beverage BV. In the present embodiment, the brew tray 35 receives a pouch containing coffee. The inlet port 30 receives water at aircraft galley pressure. A pressure sensor 36 is provided for monitoring the supply pressure of the water. The pressure sensor 36 outputs a pressure signal S1 to the ECU 16. An inlet valve 37 controls the supply of water from the inlet port 30. A drain valve 38 is provided for selectively outputting water from the beverage dispensing machine 1 to a drain 39. The inlet valve 37 and the drain valve 38 are solenoid valves which are controlled by the ECU 16. A proportional control valve 40 controls the supply of water to the flow through water heater 31. A pressure release valve 41 is provided for selectively releasing water to the drain 39. A first temperature sensor 42 monitors the temperature of the water exiting the flow through water heater 31. The first temperature sensor 42 outputs a temperature signal S2 to the ECU 16. An air vent valve 43 is provided to vent air from the system.

A two-way pinch valve 44 is provided for selectively supplying the heated water from the flow through water heater 31 to either the water tank 32 or the vessel 2. The two-way pinch valve 44 is a solenoid valve which is controlled by the ECU 16. The water tank 32 has an overflow line 45 connected to the drain 39. The water tank heating element 33 is a concealed heater for heating the water in the water tank 32. A second temperature sensor 46 is provided to monitor the temperature of the water in the water tank 32. The second temperature sensor 46 is configured to output a reset signal S3 to the ECU 16 if the temperature exceeds a predefined threshold temperature. An automatic drain valve 47 is provided for controllably draining water from the water tank 32 to the drain 39. The automatic drain valve 47 is a solenoid valve which is controlled by the ECU 16. The pump 34 is connected to the water tank 32 and is operable to supply hot water to the hot water faucet 9. The pump 34 in the present embodiment is a magnetically coupled pump for supplying the water at a controllable flow rate. The hot water faucet 9 comprises a micro-switch (not shown) for outputting a flow control signal S4 to the pump 34. The operating speed of the pump 34 is controlled in dependence on the flow control signal S4, thereby controlling the flow rate of the water dispensed through the hot water faucet 9. The two-way pinch valve 44 is operable selectively to supply hot water from the flow through water heater 31 to the vessel 2. As shown in FIG. 5, the hot water is supplied to the brew tray 35 and then flows into the vessel 2. A flow control valve 48 controls the flow rate of hot water to the brew tray 35. The drain 39 may be connected to a fascia drain 49 or a drip tray provided under the vessel heater 7.

The ECU 16 is configured to control operation of the beverage dispensing machine 1. The ECU 16 communicates with the pressure sensor 35, and the first and second temperature sensors 42, 46. The ECU 16 controls operation of the inlet valve 37, the drain valve 38 and the flow-through water heater 31 to control heating of the water. The ECU 16 controls the two-way pinch valve 44 to control the supply of hot water to the water tank 32 and the vessel 2.

The automatic drain valve 47 is also controlled by the ECU 16 to drain water from the water tank 32 to the drain 39. The pump 34 is controlled in dependence on the signal received from the micro-switch provided in the hot water faucet.

Figure 6:
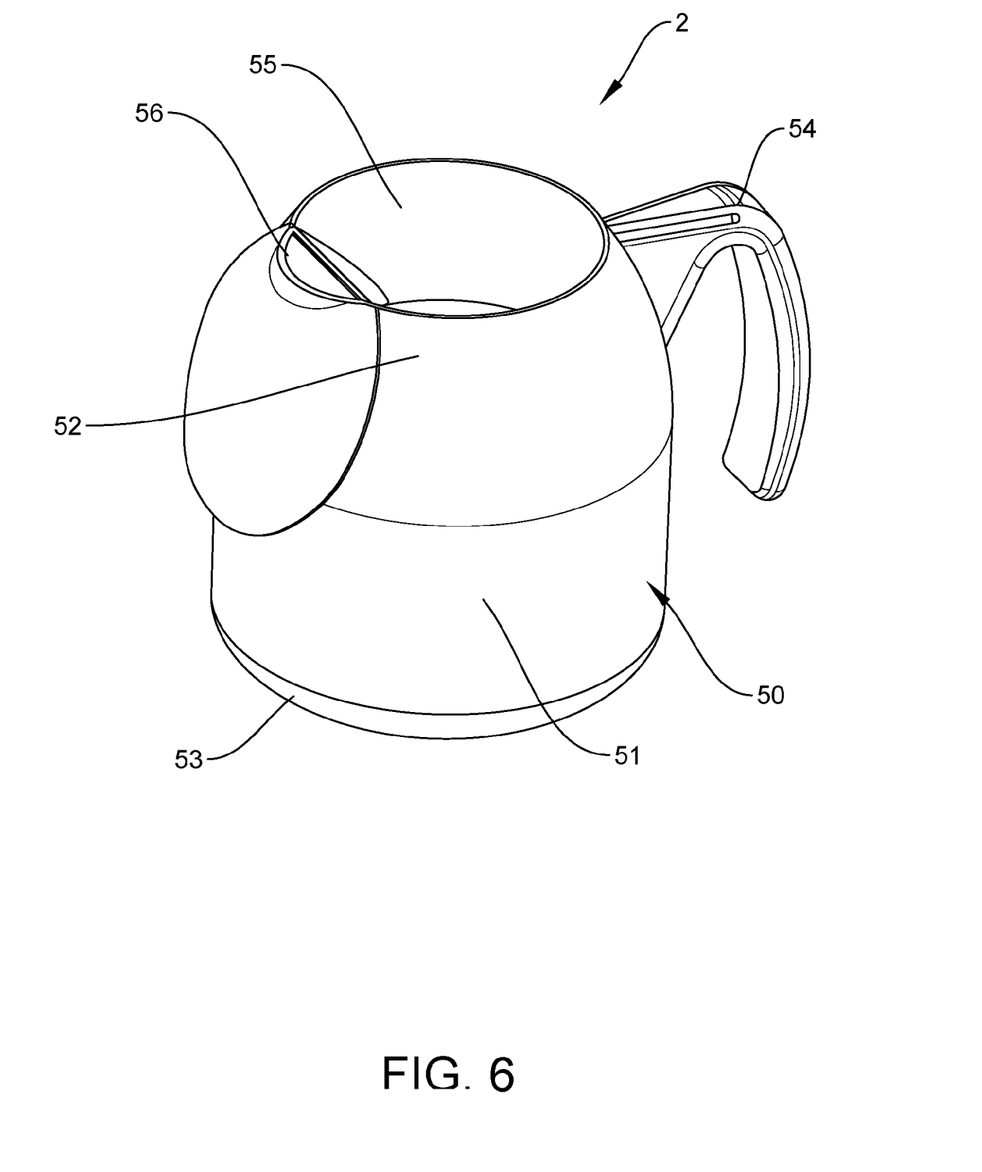
FIG. 6 shows a vessel for use in conjunction with the beverage dispensing machine.

As shown in FIG. 6, the vessel 2 is in the form of a jug having a body 50. The body 50 in the present embodiment is generally cylindrical, but it will be understood that other profiles and configurations are envisaged. The vessel 2 comprises a sidewall 51, an upper portion 52 and a base part 53. A handle 54 is fastened to the sidewall 51. An aperture 55 is formed in the upper portion 52 of the vessel 2. The aperture 55 in the present embodiment is circular and has a first diameter D1. The vessel 2 comprises a pouring spout 56 to facilitate pouring of the beverage BV from the vessel 2 into a receptable, such as a cup (not shown). The pouting spout 56 is located in the upper portion 52 of the vessel 2. The pouring spout 56 is separate from the aperture 55 in the present embodiment. In a variant, the aperture 55 and the pouring spout 56 may be combined.

As outlined above, the retention mechanism 14 is operable releasably to retain the vessel 2 in the chamber 6. As shown in FIG. 3, the retention mechanism 14 comprises a first retaining assembly 61 for engaging the upper portion 52 of the vessel 2; and a second retaining assembly 62 for engaging the sidewall 51 of the vessel 2. The configuration of the first retaining assembly 61 and the second retaining assembly 62 will now be described. The first retaining assembly 61 and the second retaining assembly 62 are operatively coupled to each other.

Thus, the retention mechanism 14 is operable to engage the upper portion 52 and the sidewall 51 of the vessel 2 at least substantially simultaneously. In use, the first retaining assembly 61 and the second retaining assembly 62 are configured to operate in concert. The first retaining assembly 61 and the second retaining assembly 62 are actuated in unison selectively to engage and/or to release the vessel 2. In the present embodiment, the operation of the first retaining assembly 61 and the second retaining assembly 62 is controlled by the handle 5. The pivoting movement of the handle 5 causes the first and second cams 15-1, 15-2 to displace the first retaining assembly 61. In use, the first retaining assembly 61 and the second retaining assembly 62 are actuated together when the handle 5 is operated. When the handle 5 is pivoted downwardly, the first retaining assembly 61 is displaced downwardly; and the first and second retaining assemblies 61, 62 are displaced towards each other. Conversely, when the handle 5 is pivoted upwardly, the first retaining assembly 61 is displaced upwardly; and the first and second retaining assemblies 61, 62 are displaced away from each other.

The first retaining assembly 61 comprises an upper engaging member 63 for engaging the upper portion 52 of the vessel 2. In the present embodiment, the upper engaging member 63 is configured at least partially to locate within the aperture 55 formed in the upper portion 52.

Figure 7A:
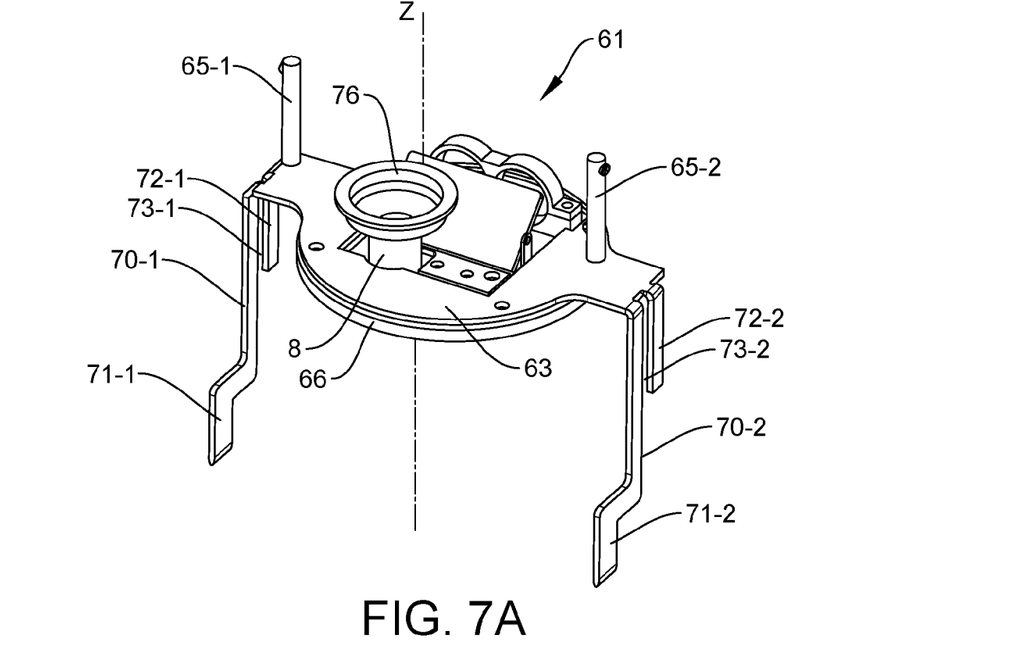
FIG. 7A shows a perspective view of the first retaining assembly for retaining the vessel in the beverage dispensing machine.
Figure 7B:
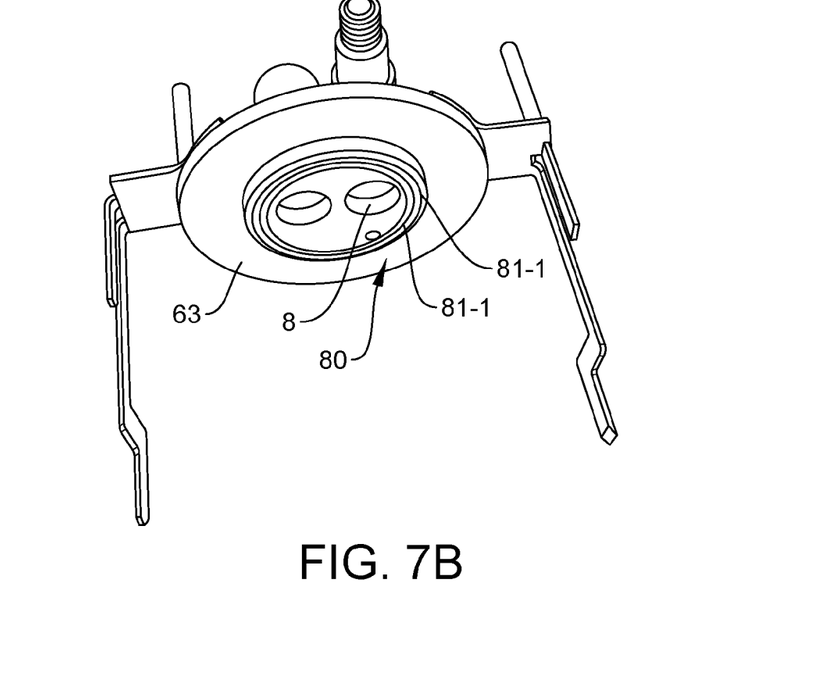
FIG. 7B shows a view of an underside of the first retaining assembly shown in FIG. 7B.
Figure 8:
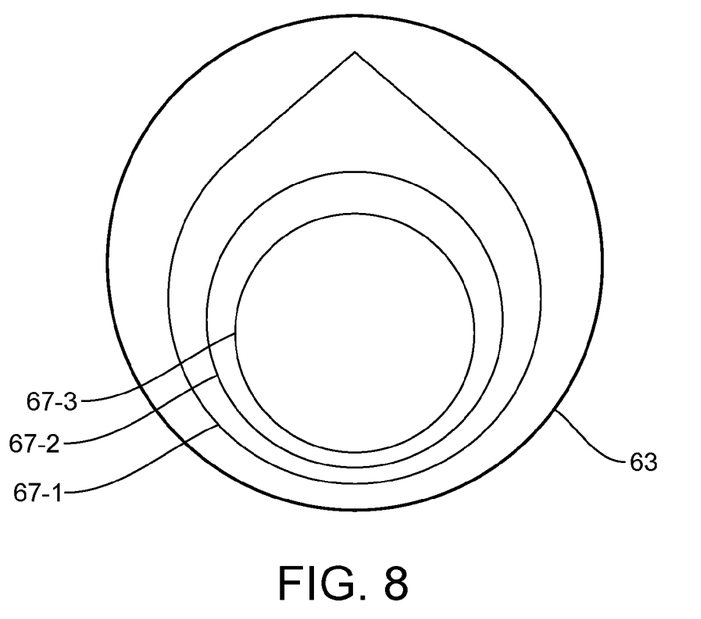
FIG. 8 shows a variant of the upper engaging member for the first retaining assembly.

The upper engaging member 63 thereby engages the upper portion 52 to retain the vessel 2 in the beverage dispensing machine 1. The upper engaging member 63 is movable between an undeployed position and a deployed position. In the undeployed position, the upper engaging member 63 is spaced apart from the upper portion 52 to enable removal of the vessel 2 from the beverage dispensing machine 1. In the deployed position, the upper engaging member 63 engages the upper portion 52 and retains the vessel 2 in the beverage dispensing machine 1. The movement of the upper engaging member 63 between the undeployed position and the deployed position comprises or consists of a vertical movement. In the present embodiment, the first retaining assembly 61 is configured such that the upper engaging member 53 translates along a vertical axis Z. As shown in FIGS. 7A and 7B, the first retaining assembly 61 comprises at least one guide member 65 for controlling movement of the upper engaging member 63. Each guide member 65 locates in a corresponding channel (not shown) formed in the dispensing assembly 11. In the present embodiment, the first retaining assembly 61 comprises first and second guide members 65-1, 65-2 in the form of vertical pistons which locate in respective first and second channels formed in the dispensing assembly 11. The upper engaging member 63 is configured at least partially to close the aperture 55 formed in the upper portion 52 of the vessel 2 when disposed in the deployed position. In the present embodiment, the upper engaging member 63 is configured at least substantially to seal the aperture 55. The upper engaging member 63 comprises a fluid seal 66 for cooperating with the upper portion 52 of the vessel 2. The fluid seal 66 in the present embodiment comprises a sealing ring, for example an O-ring. The upper engaging member 63 is configured to locate inside the aperture 55 and the fluid seal 66 forms a seal with the edge of the upper portion 52. The upper engaging member 63 in the present embodiment has a circular profile having a diameter substantially equal to the first diameter D1 of the aperture 55. The upper engaging member 63 has a centre which is at least substantially coincident with a vertical centreline of the vessel 2 located in the beverage dispensing machine 1. The upper engaging member 63 may optionally comprise a tapered outer edge to help align the vessel 2 and the upper engaging member 63. In a variant shown in FIG. 8, the upper engaging member 63 may comprise one or more features for cooperating with a range of vessels 2 having apertures 55 with different profiles and/or diameters. The one or more features may have complementary profiles for cooperating with the vessels 2 at least partially to close or seal the aperture 55. Each feature may comprise a projection 67 for cooperating with the upper portion 52 of the vessel 2. The upper engaging member 63 may comprise a plurality of annular projections 67 arranged concentrically or eccentrically. In the arrangement illustrated in FIG. 8, the upper engaging member 63 comprises three (3) projections 67-1, 67-2, 67-3 for cooperating with three (3) different vessels 2. The first and second projections 67-1, 67-2 may be configured to cooperate with different jugs; and the third projection 67-3 may be configured to cooperate with a bottle, such as an infant's bottle. A separate fluid seal 66 may be associated with each projection 67-1, 67-2, 67-3. Alternatively, the projections 67-1, 67-2, 67-3 may directly engage the upper portion 52 of the vessel 2. It will be understood that the features may comprise one or more channels or recesses for cooperating with the upper portion 52 of the vessel 2. At least a part of the upper portion 52 may locate in the channel or recess to close or seal the aperture 55.

The second retaining assembly 62 comprises first and second side engaging members 68-1, 68-2 (shown in FIGS. 2 and 3) for engaging the sidewall 51 of the vessel 2. The first and second side engaging members 68-1, 68-2 are opposable and are movable towards and away from each other. The first and second side engaging members 68-1, 68-2 are each movable between an undeployed position and a deployed position. The side engaging members 68-1, 68-2 are displaced inwardly as they travel to their deployed positions. Conversely, the side engaging members 68-1, 68-2 are displaced outwardly as they travel to their undeployed positions. In the undeployed positions, the first and second side engaging members 68-1, 68-2 are retracted such that they are spaced apart from the sidewall 51, thereby enabling removal of the vessel 2 from the beverage dispensing machine 1. In their deployed positions, the first and second side engaging members 68-1, 68-2 are extended to engage opposing sides of the sidewall 51 and retain the vessel 2 in the beverage dispensing machine 1. The movement of each of the first and second side engaging members 68-1, 68-2 between the undeployed position and the deployed position comprises or consists of a lateral movement. In the present embodiment, the first and second side engaging members 68-1, 68-2 are configured to pivot about respective pivot axis which extend vertically. The second retaining assembly 62 comprises first and second spring elements 69-1, 69-2 (only the second spring element 69-2 is visible in FIG. 2) for biasing the first and second side engaging members 68-1, 68-2 towards their respective undeployed positions. The first and second side engaging members 68-1, 68-2 may have a complementary profile for cooperating with the side wall 51 of the vessel 2. For example, the first and second side engaging members 68-1, 68-2 may have a concave inner surface.

As outlined above, the first and second retaining assemblies 61, 62 are configured to operate together. As shown in FIGS. 7A and 7B, the first retaining assembly 61 comprises first and second actuating arms 70-1, 70-2 for actuating the second retaining assembly 62. The first and second actuating arms 70-1, 70-2 extend parallel to the vertical axis Z. Each of the first and second actuating arms 70-1, 70-2 comprises an offset end section 71-1, 71-2 for engaging the first and second side engaging members 68-1, 68-2. The first and second arms 70-1, 70-2 are configured to engage the first and second side engaging members 68-1, 68-2. When the handle 5 is pivoted downwardly, the upper engaging member 63 is displaced vertically downwardly to engage the upper portion 52 of the vessel 2. The first and second actuating arms 70-1, 70-2 are displaced downwardly and engage the first and second side engaging members 68-1, 68-2 causing them to pivot inwardly (i.e. towards each other) and engage opposing sides of the sidewall 51 of the vessel 2. The movement of the first and second side engaging members 68-1, 68-2 may also centre the vessel 2, thereby helping to align the vessel 2 with the upper engaging member 63. The first retaining assembly 62 also comprises first and second alignment arms 72-1, 72-2 extending parallel to the upper portion of the first and second actuating arms 70-1, 70-2 and the first and second alignment arms 72-1, 72-2. First and second vertical tracks 73-1, 73-2 are formed between the first and second actuating arms 70-1, 70-2. The first and second vertical tracks 73-1, 73-2 cooperate with projections formed in the dispensing assembly 11 to maintain alignment of the first retaining assembly 62.

As shown in FIGS. 1 and 2, the beverage dispensing machine 1 also comprises a retainer 74 for retaining the vessel 2. The retainer 74 in the present embodiment is in the form of a turn retainer which is rotatable about an axis. The retainer 74 is rotatable between a deployed position (as shown in FIGS. 1 and 2) and an undeployed position. In the undeployed position, the retainer 74 forms a continuation of a front surround of the chamber 6. In this configuration, the retainer 74 does not obstruct or otherwise block the opening into the chamber 6 and the vessel 2 can be inserted into or removed from the beverage dispensing machine 1. In the deployed position, the retainer 74 extends outwardly from the front surround of the chamber 6, partially blocking or obstructing the opening into the chamber 6. In this configuration, the retainer 74 engages a front of a vessel 2 disposed in the chamber 6, thereby helping to retain the vessel 2 in the beverage dispensing machine 1. The retainer 74 can be operated by hand and is not connected to the handle 5. Thus, the retainer 74 can be operated independently of the upper engaging member 63 and the first and second side engaging members 68-1, 68-2. In the present embodiment, the retainer 74 is disposed at the bottom of the beverage dispensing machine 1 and configured to engage a lower portion of the vessel 2, such as a base. In a variant, the retainer 74 may be disposed to a side of the chamber 6.

Figure 9:
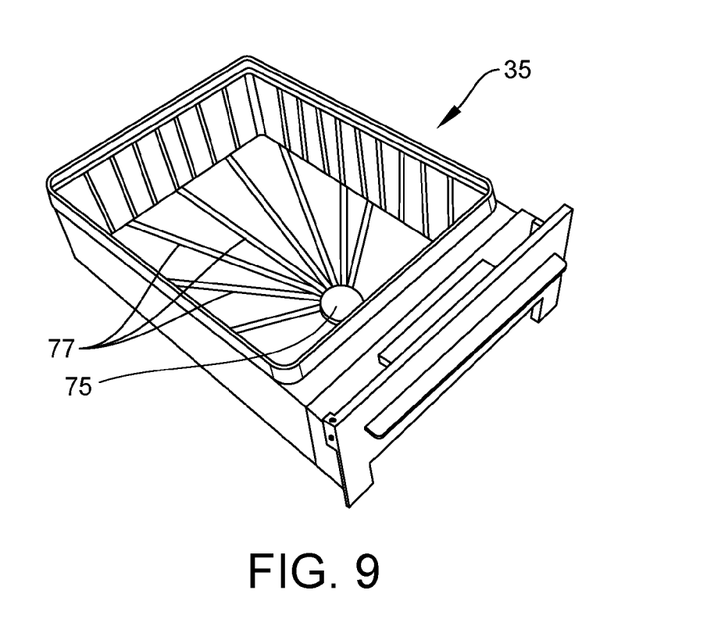
FIG. 9 shows a perspective view of a brew tray for the beverage dispensing machine.

A perspective view of the brew tray 35 is shown in FIG. 9. The brew tray 35 locates in a cavity formed in the dispensing assembly. In the present embodiment, the brew tray 35 can be accessed when the handle 5 is in the lowered position. The brew tray 35 can be removed from the beverage dispensing machine 1 to insert or remove a coffee pouch. An outlet aperture 75 is formed in the base of the brew tray 35. The outlet aperture 75 aligns with a funnel 76 disposed on the upper engaging member 63 for guiding the beverage BV into the vessel 2. The brew tray 35 comprises a plurality of drainage guides 77 extending radially outwardly from the outlet aperture 75. The drainage guides 77 project upwardly from the bottom of the brew tray 35 and, in use, guide the beverage BV towards the outlet aperture 75.

As shown in FIG. 7B, a sensor 80 is provided on the upper engaging member 63 for determining when the beverage BV is at a predetermined level L in the vessel 2. The sensor 80 comprises first and second electrodes 81-1, 81-2 spaced apart from each other. The first and second electrodes 81-1, 81-2 are concentric circles extending around the dispensing nozzle 8. The first and second electrodes 81-1, 81-2 are disposed at a fixed position on the upper engaging member 63. When the upper engaging member 63 is deployed, the first and second electrodes 81-1, 81-2 extend into the upper portion 52 of the vessel 2. The sensor 80 locates within the upper portion 52 of the vessel 2. In use, the sensor 80 determines when the beverage BV in the vessel 2 is at the predetermined level L corresponding to the vertical height of the sensor 80. The predetermined level L is at or proximal to the top of the vessel 2 such that the sensor 80 provides an indication when the vessel 2 is partially or completely full. When the liquid in the vessel 2 is at the predetermined level L, the electrical circuit between the first and second electrodes 81-1, 81-2 is completed. The ECU 16 can thereby determine when the vessel 2 is full. To reduce or prevent spillage of the beverage BV from the vessel 2, the ECU 16 can operate the two-way pinch valve 44 to prevent the supply of hot water to the brew tray 35. Other types of sensor may be used to detect or monitor the liquid level in the vessel 2.

Figure 10:
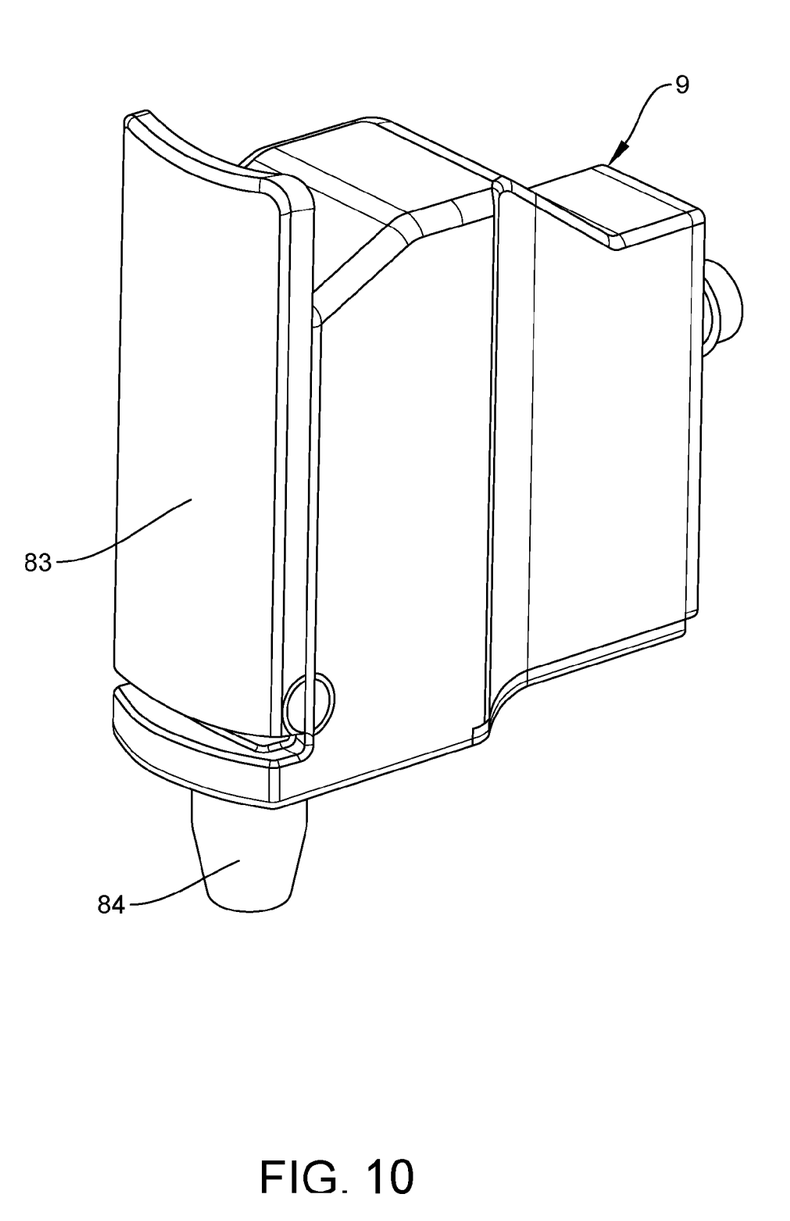
FIG. 10 shows a perspective view of a hot water faucet for the beverage dispensing machine.

The hot water faucet 9 is shown in FIG. 10. The hot water faucet 9 comprises a mechanically-operated spring loaded stem-bellow construction for opening/closing a valve. A lever 83 operates an internal micro-switch which controls operation of the pump 34. The hot water faucet 9 has an outlet nozzle 84. In the present embodiment, the outlet nozzle 84 is positioned vertically on the front of the beverage dispensing machine 1 to least substantially to align with the handle 5 in its lowered position. The hot water faucet 9 can be operated irrespective of the position of the handle 5.

The handle 5 is pivoted upwardly to the raised position to enable the vessel 2 to be inserted into the chamber 6. The handle 5 is pivoted downwardly to the lowered position to operate the retention mechanism 14 and retain the vessel 2 in the chamber 6. The handle 5 actuates the first and second retaining assemblies 61, 62. The upper engaging member 63 is displaced downwardly to engage the upper portion 52 of the vessel 2; and the first and second side engaging members 68-1, 68-2 are displaced inwardly to engage the sidewall 51 of the vessel 2. With the handle 5 in the lowered position, the beverage dispensing machine 1 can be operated via the control panel 14. A user can initiate an operating cycle to brew a beverage BV. The user may select an appropriate operating cycle, for example by indicating a volume of the vessel 2 or a volume of the beverage BV to be dispensed. The water supplied to the beverage dispensing machine 1 is heated by the flow-through water heater 31. The ECU 16 controls the two-way pinch valve 44 to control the supply of hot water to the brew tray 25. The beverage BV is brewed in the brew tray 35 and dispensed into the vessel 2. The vessel heater 7 is energized to heat the vessel 2 and the beverage BV. If the vessel 2 is full (or overflows), the sensor 80 outputs a signal to the ECU 16 to close the two-way pinch valve 44. When the operating cycle is complete, the handle 5 is raised and the first and second retaining assemblies 61, 62 are released. The vessel 2 can then be removed from the beverage dispensing machine 1. In the present embodiment, the hot water faucet 9 can be operated independently of the brewing function to dispense hot water from the hot water tank 32.

Figure 11:
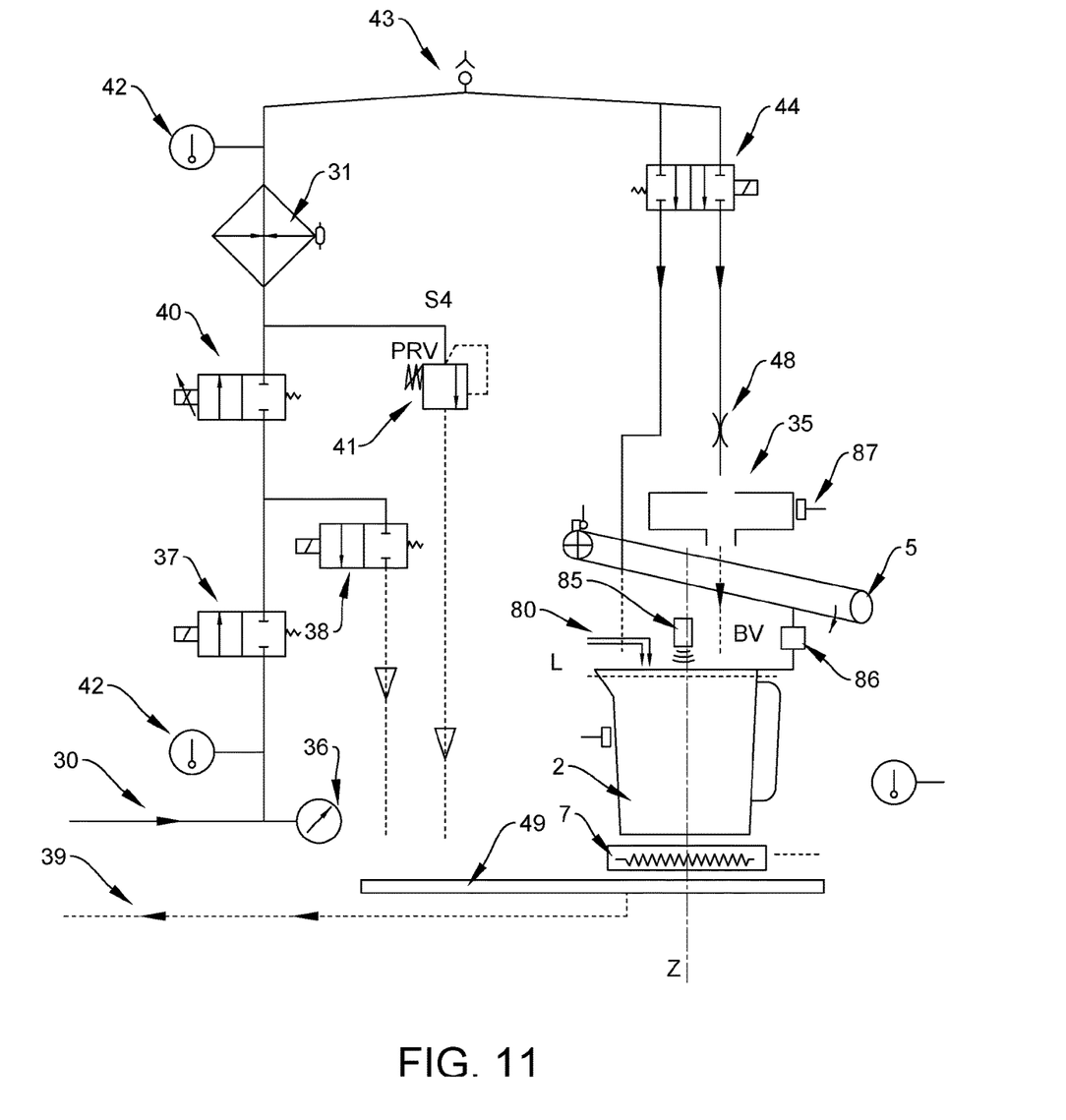
FIG. 11 shows a schematic representation of a beverage dispensing machine according to a further embodiment.

The beverage dispensing machine 1 in the above embodiment comprises a hot water tank 32 for supplying hot water to the hot water faucet 9. In a modified arrangement, the hot water tank 32 may be omitted. A schematic representation of this arrangement is shown in FIG. 11. Like reference numerals are used for like components. The two-way pinch valve 44 is used to control the supply of hot water to the brew tray 25 and the hot water faucet 9. The ECU 16 is configured to close the inlet valve 37 to prevent the supply of water to the flow-through water heater 31. The two-way pinch valve 44 could be replaced with a three-way pinch valve (not shown), for example to prevent the supply of hot water to both the brew tray 25 and the hot water faucet 9. As shown in FIG. 5, the beverage dispensing machine 1 comprises a liquid level sensor 85 for determining the level of the beverage BV in the vessel 2. The liquid level sensor 85 may, for example, comprise an ultrasonic sensor. The ultrasonic sensor may be oriented downwardly into the vessel 2. By monitoring a time-of-flight of the ultrasonic signal reflected off the surface of the beverage BV, the level of the beverage BV can be determined. The liquid level sensor 85 may output a level signal to the ECU 16. The beverage dispensing machine 1 comprises a vessel sensor 86 for detecting the presence or absence of the vessel 2; and a tray sensor 87 for detecting the presence or absence of the brew tray 35. The vessel sensor 86 and the tray sensor 87 communicate with the ECU 16. The ECU 16 may be configured to inhibit the supply of water if the vessel 2 and/or the brew tray 35 are not present.

It will be appreciated that various changes and modifications can be made to the present invention without departing from the scope of the present application.

The ECU 16 could be configured to monitor the position of the handle 5. The two-way pinch valve 44 could be controlled to prevent the supply of hot water to the brew tray 35 when the handle 5 is in the raised position. The two-way pinch valve 44 could be controlled to supply hot water to the brew tray 35 only when the handle 5 is in the lowered position.

A lock could be provided to secure the handle 5 in the lowered position during an operating cycle. The lock could, for example, comprise an electromechanical latching mechanism or an electromagnet. The lock may be released when the operating cycle is complete. The ECU 16 could be configured to control activation and release of the lock.

The beverage dispensing apparatus 1 has been described herein as brewing coffee from a coffee pouch. The beverage dispensing apparatus 1 may be configured to receive a capsule for making the beverage BV, for example a coffee capsule. The beverage dispensing apparatus 1 may also be used to brew tea or other beverages.

The invention claimed is:

1. A beverage dispensing machine for dispensing a beverage into a vessel, wherein the beverage dispensing machine comprises:
   a retention mechanism comprising:
      a first retaining assembly comprising an upper engaging member movable to a deployed position for engaging an upper portion of the vessel; and
      a second retaining assembly comprising opposing first and second at least one side engaging members movable to deployed positions for engaging a opposing sides of the vessel;
      wherein the first retaining assembly comprises at least one actuating arm for actuating the second retaining assembly to deploy the first and second side engaging members; and
      an actuating mechanism operable to actuate the retention mechanism to deploy the upper engaging member in conjunction with the first and second side engaging members to retain the vessel in the beverage dispensing machine.

2. A beverage dispensing machine as claimed in claim 1, wherein deployment of the upper engaging member comprises a vertical movement of the upper engaging member.

3. A beverage dispensing machine as claimed in claim 1 comprising a dispensing nozzle for dispensing the beverage through an aperture formed in the vessel; wherein, when deployed, the upper engaging member is configured at least partially to close the aperture.

4. A beverage dispensing machine as claimed in claim 3, wherein the upper engaging member comprises at least one fluid seal for cooperating with the vessel at least substantially to seal the aperture.

5. A beverage dispensing machine as claimed in claim 4, wherein the or each fluid seal comprises an annular seal.

6. A beverage dispensing machine as claimed in claim 4, wherein the upper engaging member comprises a plurality of the fluid seals, the fluid seals having different sizes and/or profiles for cooperating with a plurality of vessels having apertures of different sizes and/or profiles.

7. A beverage dispensing machine as claimed in claim 1, wherein the upper engaging member comprises a plurality of the fluid seals, the fluid seals having different sizes and/or profiles for cooperating with a plurality of vessels having apertures of different sizes and/or profiles; wherein the fluid seals each comprise an annular seal, and the plurality of the fluid seals are arranged concentrically.

8. A beverage dispensing machine as claimed in claim 4, wherein the dispensing nozzle is disposed in the upper engaging member; and the at least one fluid seal extends around the dispensing nozzle.

9. A beverage dispensing machine as claimed in claim 1 comprising a sensor for detecting that the liquid is at a predetermined level in the vessel.

10. A beverage dispensing machine as claimed in claim 9, wherein the sensor comprises first and second electrodes disposed on the upper engaging member.

11. A beverage dispensing machine as claimed in claim 10, wherein the first and second electrodes comprise first and second concentric annular electrodes.

12. A beverage dispensing machine as claimed in claim 1, wherein deployment of the at least one side engaging member comprises a lateral movement of the or each side engaging member to engage the sidewall of the vessel.

13. A beverage dispensing machine as claimed in claim 1 further comprising a retainer for retaining the vessel in the beverage dispensing machine.

14. A beverage dispensing machine as claimed in claim 13, wherein the operation of the retainer is independent of the actuating mechanism.

15. A beverage dispensing machine as claimed in claim 1, wherein the actuating mechanism comprises a handle.

16. A beverage dispensing machine as claimed in claim 15, wherein the upper engaging member and the first and second side engaging members are actuated when the handle is operated.

17. A beverage dispensing machine as claimed in claim 16, wherein the handle is movable between a locked position and an unlocked position.

18. A beverage dispensing machine as claimed in claim 1, wherein the actuating mechanism comprises a solenoid or an electromechanical actuator.

\* \* \* \* \*